United States Patent
Islam et al.

(10) Patent No.: US 10,159,035 B2
(45) Date of Patent: Dec. 18, 2018

(54) METHODS FOR BACKHAUL OPERATIONS IN MILLIMETER WAVE NETWORKS

(71) Applicant: QUALCOMM Incorporated, San Diego, CA (US)

(72) Inventors: Muhammad Nazmul Islam, Edison, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/842,679

(22) Filed: Sep. 1, 2015

(65) Prior Publication Data

US 2016/0269983 A1    Sep. 15, 2016

Related U.S. Application Data

(60) Provisional application No. 62/131,787, filed on Mar. 11, 2015.

(51) Int. Cl.
*H04W 56/00* (2009.01)
*H04W 48/16* (2009.01)
(Continued)

(52) U.S. Cl.
CPC ........ *H04W 48/16* (2013.01); *H04B 7/15507* (2013.01); *H04L 12/46* (2013.01);
(Continued)

(58) Field of Classification Search
CPC ... H04W 84/045; H04W 16/28; H04W 24/02; H04W 92/12; H04W 48/16; H04W 88/06; H04M 15/46; H04M 15/8351
See application file for complete search history.

(56) References Cited

U.S. PATENT DOCUMENTS 8,743,850 B2    6/2014  Cordeiro
2002/0032013 A1*  3/2002  Pinola .................. H04W 52/52
                                                       455/136

(Continued)

FOREIGN PATENT DOCUMENTS

WO    WO-2014036059 A1    3/2014
WO    WO-2014124048 A1    8/2014
WO    WO-2014124164 A1    8/2014

OTHER PUBLICATIONS

ISA/EPO, International Search Report and Written Opinion of the International Searching Authority, Int'l. App. No. PCT/US2016/018660, dated Apr. 26, 2016, European Patent Office, Rijswijk, NL, 12 pgs.

*Primary Examiner* — Quan M Hua
(74) *Attorney, Agent, or Firm* — Holland & Hart LLP

(57) ABSTRACT

Method, systems, and apparatuses are described for discovery operations in a millimeter wave wireless communication system. A first base station of the millimeter wave wireless communication system may determine a timing parameter and a propagation parameter associated with a second base station of the millimeter wave wireless communication system. The first base station may perform a discovery procedure with the second base station based at least in part on the timing parameter and the propagation parameter. At least a portion of the discovery procedure may be performed wirelessly via the millimeter wave wireless communication system. The first base station may establish a backhaul communication link with the second base station based on the discovery procedure.

24 Claims, 10 Drawing Sheets

(51) Int. Cl.
*H04W 8/00* (2009.01)
*H04W 84/22* (2009.01)
*H04B 7/155* (2006.01)
*H04L 12/46* (2006.01)
*H04W 88/04* (2009.01)

(52) U.S. Cl.
CPC ........... *H04W 8/00* (2013.01); *H04W 56/001* (2013.01); *H04W 84/22* (2013.01); *H04W 88/04* (2013.01)

(56) References Cited

U.S. PATENT DOCUMENTS

| | | | |
|---|---|---|---|
| 2010/0054237 A1* | 3/2010 | Han | H04J 3/0638 370/350 |
| 2013/0142136 A1 | 6/2013 | Pi et al. | |
| 2013/0237218 A1 | 9/2013 | Li et al. | |
| 2014/0321282 A1* | 10/2014 | Pragada | H04W 36/0072 370/235 |
| 2014/0370936 A1 | 12/2014 | Ling | |
| 2015/0078167 A1* | 3/2015 | Papa | H04W 28/10 370/235 |
| 2015/0109943 A1 | 4/2015 | Sahin et al. | |
| 2015/0172034 A1* | 6/2015 | Kishiyama | H04W 36/00 370/329 |
| 2015/0245234 A1* | 8/2015 | Roy | H04W 16/14 370/252 |
| 2015/0271738 A1* | 9/2015 | Cheng | H04W 16/24 455/422.1 |

* cited by examiner

METHODS FOR BACKHAUL OPERATIONS IN MILLIMETER WAVE NETWORKS

CROSS REFERENCES

The present application for Patent claims priority to U.S. Provisional Patent Application No. 62/131,787 by Islam et al., entitled "Methods for Backhaul Operations in Millimeter Wave Networks," filed Mar. 11, 2015, assigned to the assignee hereof, and expressly incorporated by reference herein.

BACKGROUND

Field of the Disclosure

The present disclosure, for example, relates to wireless communication systems, and more particularly to backhaul operations in a millimeter wave wireless communication system.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). A base station may communicate, either directly or indirectly with other base stations over backhaul links.

A base station, in a conventional communication system, typically enjoys a robust link to a network entity which coordinates aspects of the discovery and backhaul communications, e.g., the network entity provides timing information, cell identity, etc., for neighboring base stations to coordinate discovery and backhaul transmissions. Base stations operating in the millimeter wave (mmW) frequency ranges, e.g., 28 GHz, 40 GHz, 60 GHz, etc., may be associated with a reduced coverage area (e.g., a smaller geographic footprint, directional transmissions only, etc.), which may result in deployment of a much larger number of base stations to provide acceptable coverage areas. Such large-scale mmW base station deployments may impact the quality and availability of links to a network entity. For example, some mmW base stations may be deployed in areas with limited bandwidth links to a network entity and, in some examples, no links to a network entity. In a conventional cellular communication system, base stations may rely on a wired connection to a network entity and, therefore, may not typically perform discovery over the wireless medium. Such mmW base stations with limited or no links to a network entity still have a need to be able to discover other mmW base stations in order to perform backhaul operations. Moreover, such wireless discovery operations may provide a more beneficial deployment scheme for a dense population of mmW base stations, e.g., provide a lower cost and more feasible option to installing fiber optic communication lines to each mmW base station.

SUMMARY

The described features generally relate to one or more improved systems, methods, and/or apparatuses for backhaul operations in a mmW wireless communication system. Certain aspects of the present description employ various approaches for a mmW base station to determine certain parameters associated with another mmW base station to perform a discovery procedure. For example, a first mmW base station may access, identify, or otherwise determine parameters for a second mmW base station associated with timing, propagation, and the like, e.g., a first set of communication parameters for the second mmW base station. The first set of communication parameters may include a sufficient amount of information associated with the second mmW base station to permit the first mmW base station to initiate a discovery procedure with the second base station. The discovery procedure, or at least a portion thereof, may be performed via the mmW wireless communication system.

In certain aspects, the first mmW base station may determine the first set of communication parameters using a blind detection mode, using a network-assisted mode, using a UE assisted mode, or combinations thereof. An example of a blind detection mode may include the first base station refraining from transmitting a synchronization signal during a synchronization period and, instead, listening for a synchronization signal from the second base station. A detected synchronization signal from the second base station may provide sufficient information for the second base station to permit the first base station to initiate the discovery procedure. An example of a network assisted mode may include the first base station utilizing a limited link (e.g., low bandwidth link, data limited link, etc.) with a network entity to determine the first set of communication parameters. An example of a UE assisted mode may include identifying a UE that is in communication with the first base station and the second base station. The first base station may leverage the UE to exchange information with the second base station to determine the first set of communication parameters. Generally, during the discovery procedure, the first base station may identify or determine additional communication parameters associated with the second base station, e.g., a second set of communication parameters. Examples of the second set of communication parameters may include modulation-coding schemes (MCS), frame alignment timing information, beacon transmission timing information, etc.

In a first illustrative set of examples, a method for wireless communication in a millimeter wave wireless communication system is described. The method may include: determining, by a first base station of the millimeter wave wireless communication system, a timing parameter and a propagation parameter associated with a second base station of the millimeter wave wireless communication system; and performing a discovery procedure with the second base station based at least in part on the timing parameter and the propagation parameter, wherein at least a portion of the discovery procedure is performed wirelessly via the millimeter wave wireless communication system.

In some examples, the method may include: identifying a network entity having a connection to the first base station and the second base station; and receiving information from the network entity indicative of at least one of the timing parameter, or the propagation parameter, or a combination thereof. The method may include transmitting information to the network entity indicating a request to establish a backhaul communication link with the second base station. The network entity may be connected to the first base station and the second base station via a wired communication link. The network entity may be connected to the first base station and the second base station via a wireless communication link associated with a third base station of the millimeter wave wireless communication system.

In some examples, the information received from the network entity indicative of at least one of the timing parameter or the propagation parameter may be based at least in part on a previous backhaul communication link of the first base station or the second base station, or a geographic location of the first base station and the second base station, or a message received from one or more user equipments (UEs) associated with communications via the first base station or the second base station, or combinations thereof. The information received from the network entity may include an indication of a timing window parameter associated with a timing window for attempting to perform the discovery procedure, a search beam parameter associated with a quantity of beams being transmitted by the second base station, a sequence parameter associated with a transmission sequence of the second base station, a base station capabilities parameter identifying one or more capabilities of the second base station, or combinations thereof.

In some examples, the method may include: refraining, by the first base station, from transmitting a synchronization signal during a synchronization period; and monitoring, by the first base station during the synchronization period, for a synchronization signal transmitted by the second base station. The method may include, upon determining that the second base station has transmitted a synchronization signal, initiating the discovery procedure based at least in part on the transmitted synchronization signal. The message to the second base station to initiate the discovery procedure may be sent via a directional random access channel (DRACH).

In some examples, the method may include determining, by the first base station, a predetermined periodicity associated with refraining from transmitting the synchronization signal and monitoring for the synchronization signal transmission from the second base station. The predetermined periodicity may be determined based at least in part on information received from a network entity. The synchronization signal transmitted from the second base station may include a directional primary synchronization signal (DPSS).

In some examples, the method may include: determining, by the first base station, that at least one user equipment (UE) is in communication with the first base station and the second base station; and relaying one or more messages to the second base station through the at least one UE to determine at least one of the timing parameter or the propagation parameter associated with the second base station. The method may include: receiving one or more messages from the UE including information associated with the second base station; and determining to perform the discovery procedure based at least in part on the one or more messages received from the UE.

In some examples, the information received from the UE associated with the second base station may include an indication of a timing window parameter associated with a timing window for attempting to perform the discovery procedure, a search beam parameter associated with a quantity of beams being transmitted by the second base station, a sequence parameter associated with a transmission sequence of the second base station, a base station capabilities parameter identifying one or more capabilities of the second base station, or combinations thereof. The at least one UE may be in communication with the first base station and the second base station via a wireless communication link of the millimeter wave wireless communication system. The method may include establishing a backhaul communication link with the second base station based at least in part on the discovery procedure.

In some examples, the backhaul communication link may be a wireless backhaul communication link established via the millimeter wave wireless communication system. The method may include performing one or more coordination functions with the second base station via the backhaul communication link. The timing parameter may be based at least in part on a frame timing for communications associated with the second base station of the millimeter wave wireless communication system. The propagation parameter may be based at least in part on a beamforming pattern for communications between the first base station and the second base station.

In a second illustrative set of examples, an apparatus for wireless communication is described. The apparatus may include: a processor; memory in electronic communication with the processor; and instructions stored in the memory. The instructions being executable by the processor to: determine, by a first base station of the millimeter wave wireless communication system, a timing parameter and a propagation parameter associated with a second base station of the millimeter wave wireless communication system; and perform a discovery procedure with the second base station based at least in part on the timing parameter and the propagation parameter, wherein at least a portion of the discovery procedure is performed wirelessly via the millimeter wave wireless communication system.

In some examples, the apparatus may include instructions executable by the processor to: identify a network entity having a connection to the first base station and the second base station; and receive information from the network entity indicative of at least one of the timing parameter, or the propagation parameter, or a combination thereof. The apparatus may include instructions executable by the processor to transmit information to the network entity indicating a request to establish a backhaul communication link with the second base station. The network entity may be connected to the first base station and the second base station via a wired communication link. The network entity may be connected to the first base station and the second base station via a wireless communication link associated with a third base station of the millimeter wave wireless communication system.

In some examples, the information received from the network entity indicative of at least one of the timing parameter or the propagation parameter is based at least in part on a previous backhaul communication link of the first base station or the second base station, or a geographic location of the first base station and the second base station, or a message received from one or more user equipments (UEs) associated with communications via the first base station or the second base station, or combinations thereof. The information received from the network entity may include an indication of a timing window parameter associated with a timing window for attempting to perform the discovery procedure, a search beam parameter associated with a quantity of beams being transmitted by the second base station, a sequence parameter associated with a transmission sequence of the second base station, a base station capabilities parameter identifying one or more capabilities of the second base station, or combinations thereof.

In some examples, the apparatus may include instructions executable by the processor to: refrain, by the first base station, from transmitting a synchronization signal during a synchronization period; and monitor, by the first base station during the synchronization period, for a synchronization signal transmitted by the second base station. The apparatus may include instructions executable by the processor to, upon determining that the second base station has transmitted a synchronization signal, initiate the discovery procedure based at least in part on the transmitted synchronization signal. The message to the second base station to initiate the discovery procedure may be sent via a directional random access channel (DRACH). The apparatus may include instructions executable by the processor to determine, by the first base station, a predetermined periodicity associated with refraining from transmitting the synchronization signal and monitoring for the synchronization signal transmission from the second base station.

In some examples, the predetermined periodicity is determined based at least in part on information received from a network entity. The synchronization signal transmitted from the second base station may include a directional primary synchronization signal (DPSS). The apparatus may include instructions executable by the processor to determine, by the first base station, that at least one user equipment (UE) is in communication with the first base station and the second base station; and relay one or more messages to the second base station through the at least one UE to determine at least one of the timing parameter or the propagation parameter associated with the second base station.

In some examples, the apparatus may include instructions executable by the processor to: receive one or more messages from the UE including information associated with the second base station; and determine to perform the discovery procedure based at least in part on the one or more messages received from the UE. The information received from the UE associated with the second base station may include an indication of a timing window parameter associated with a timing window for attempting to perform the discovery procedure, a search beam parameter associated with a quantity of beams being transmitted by the second base station, a sequence parameter associated with a transmission sequence of the second base station, a base station capabilities parameter identifying one or more capabilities of the second base station, or combinations thereof.

In some examples, the at least one UE is in communication with the first base station and the second base station via a wireless communication link of the millimeter wave wireless communication system. The apparatus may include instructions executable by the processor to establish a backhaul communication link with the second base station based at least in part on the discovery procedure. The backhaul communication link may be a wireless backhaul communication link established via the millimeter wave wireless communication system. The apparatus may include instructions executable by the processor to perform one or more coordination functions with the second base station via the backhaul communication link.

In some examples, the timing parameter is based at least in part on a frame timing for communications associated with the second base station of the millimeter wave wireless communication system. The propagation parameter may be based at least in part on a beamforming pattern for communications between the first base station and the second base station.

In a third illustrative set of examples, an apparatus for wireless communication is described. The apparatus may include: means for determining, by a first base station of the millimeter wave wireless communication system, a timing parameter and a propagation parameter associated with a second base station of the millimeter wave wireless communication system; and means for performing a discovery procedure with the second base station based at least in part on the timing parameter and the propagation parameter, wherein at least a portion of the discovery procedure is performed wirelessly via the millimeter wave wireless communication system.

In some examples, the apparatus may include means for identifying a network entity having a connection to the first base station and the second base station; and means for receiving information from the network entity indicative of at least one of the timing parameter, or the propagation parameter, or a combination thereof. The apparatus may include means for transmitting information to the network entity indicating a request to establish a backhaul communication link with the second base station.

In a fourth illustrative set of examples, a non-transitory computer-readable medium storing computer-executable code for wireless communication is described. The code executable by a processor to: determine, by a first base station of the millimeter wave wireless communication system, a timing parameter and a propagation parameter associated with a second base station of the millimeter wave wireless communication system; and perform a discovery procedure with the second base station based at least in part on the timing parameter and the propagation parameter, wherein at least a portion of the discovery procedure is performed wirelessly via the millimeter wave wireless communication system.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
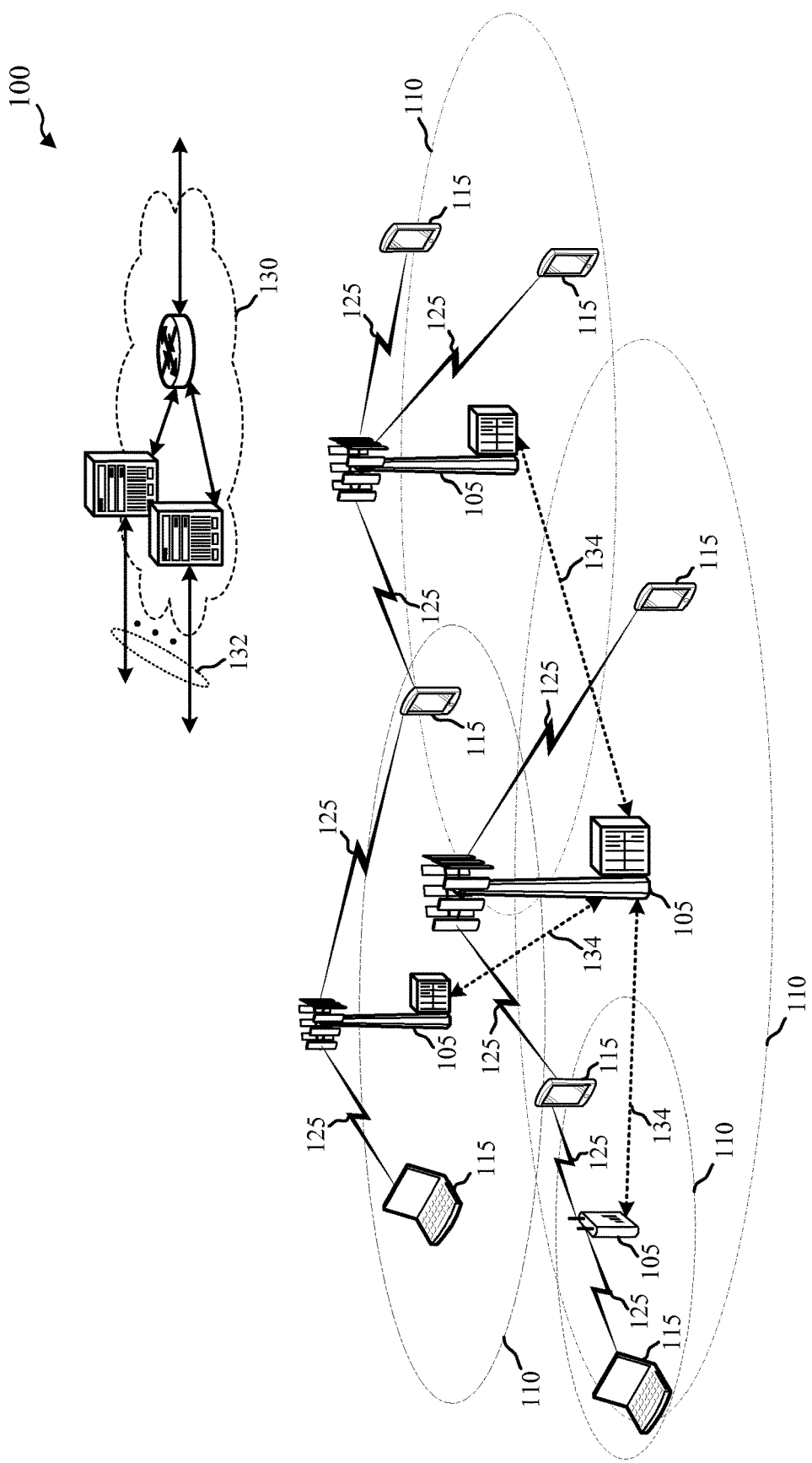
FIG. 1 shows a block diagram of a wireless communication system, in accordance with various aspects of the present disclosure.

Next generation cellular communication systems may utilize mmW wireless communication channels. Such mmW communication channels may involve using frequencies in the 20+ GHz range, which requires additional considerations in the development and deployment of the infrastructure components. For example, mmW wireless links tend to have a smaller geographic coverage area and often require use of directional transmissions. In order to provide wide scale coverage, a more dense population of mmW base stations may be deployed, with respect to traditional macro base stations for existing cellular communication systems. In some environments, it may not be reasonable from a cost and/or feasibility perspective, to deploy high speed wired communication links to every mmW base station. For example, not every deployment location will be suitable for a strong communication link between the mmW base station and a network entity. Such mmW base stations with limited or no direct links to a network entity will, therefore, establish direct links with one or more neighboring mmW base stations to access network functionality and perform traditional backhaul operations. Discovering such neighboring base stations, however, can be problematic in a mmW infrastructure due to the limited (or no) access to a network entity.

According to aspects of the present description, in high frequency systems (e.g., millimeter wave communication systems), a base station may determine certain communication parameters associated with a second base station in order to initiate a discovery procedure with the second base station. For example, given the directional nature of mmW communications, a first base station may determine a propagation parameter associated with the second base station, e.g., to know which direction the second base station is in relation to the first base station. Additionally or alternatively, the first base station may determine a timing parameter associated with the second base station, e.g., an indication of synchronization signal transmission timing by the second base station. The propagation and timing parameters may provide sufficient information for the first base station to initiate a discovery procedure with the second base station. During the discovery procedure, the first base station may determine any remaining communication parameters necessary to establish a backhaul link with the second base station, e.g., frame timing and alignment information, MCS schemes, channel availability information, base station capabilities information, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links. In some examples, certain base stations 105 may have no (or a limited) connection to the core network 130 and, instead, rely on a direct wireless connection to a neighboring base station 105 to perform discovery and backhaul operations.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter wave band (or mmW), since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support discovery procedures for millimeter wave communications. For example, a millimeter wave base station 105 may have no (or limited) connectivity to the core network 130 and, therefore, perform a discovery procedure with a neighboring millimeter wave base station 105 to establish a backhaul link (e.g., the neighboring millimeter wave base station 105 may have robust connectivity to various network components). The first millimeter wave base station 105 may determine a propagation parameter and/or a timing parameter for the second (or neighboring) millimeter wave base station. The timing and propagation parameter may provide sufficient information for the first millimeter wave base station 105 to attempt to detect a beacon or synchronization signal from the second millimeter wave base station. The first millimeter wave base station 105 may initiate the discovery procedure based on the timing and/or the propagation parameters.

In some examples, the first millimeter wave base station 105 may determine the timing and propagation parameters by accessing a network entity, e.g., using a limited or restricted link to the network entity. For example, the first millimeter wave base station 105 may send a message via the limited link to the network entity requesting information associated with neighboring base stations. The network entity may respond by sending the timing and/or propagation parameters. Another example may include the first millimeter wave base station 150 identifying a UE 115 in communication with the second millimeter wave base station. The first millimeter wave base station 105 may utilize communication link via the shared UE 115 to determine the timing and/or propagation parameters. Other examples may include the first millimeter wave base station 105 blindly detecting the timing and/or propagation parameters based on resource partitioning schemes, e.g., partitioning access resources and backhaul resources. The first millimeter wave base station 105 may initiate a discovery procedure with the second millimeter wave base station using the determined parameters and, based on the discovery procedures, determine additional communication parameters associated with the second millimeter wave base station used for establishing a backhaul communication link.

Figure 2:
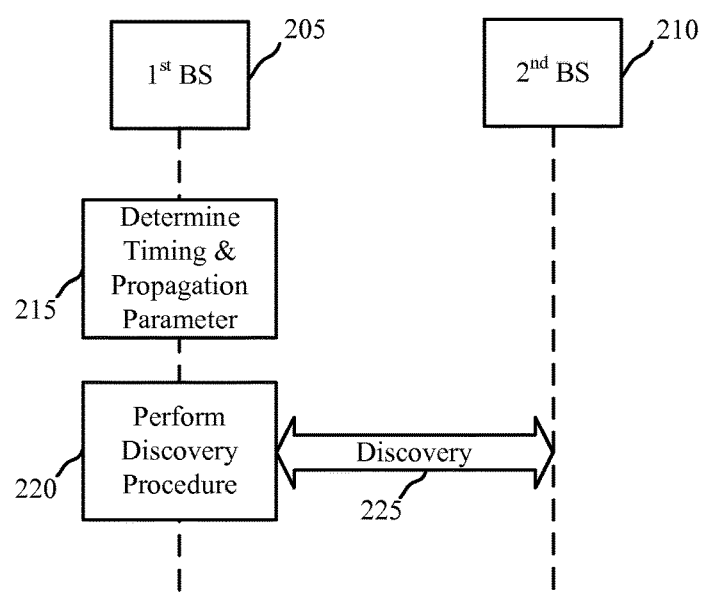
FIG. 2 shows a swim diagram illustrating aspects of discovery operations in wireless communication, in accordance with various aspects of the present disclosure.

FIG. 2 is a swim diagram 200 illustrating aspects of discovery operations, in accordance with various aspects of the present disclosure. The diagram 200 may illustrate aspects of the system 100 described with reference to FIG. 1. The diagram 200 includes a first millimeter wave (mmW) base station 205 and a second mmW base station 210. The first mmW base station 205 and/or the second mmW base station 210 may be examples of one or more of the base stations 105 described above with respect to FIG. 1. Generally, the diagram 200 illustrates aspects of implementing discovery operations in millimeter wave communication systems. In some examples, a system device, such as one of the base stations 105 may execute one or more sets of codes to control the functional elements of the device to perform some or all of the functions described below.

At block 215, the first mmW base station 205 may determine a timing parameter and a propagation parameter associated with the second base station 210. The timing parameter may include various timing components associated with communicating with the second mmW base station 210. For example, the timing component may include information associated with scheduling for beacon and/or synchronization signals from the second base station 210. Other examples of timing parameters may include, but are not limited to, frame alignment and timing information, common synchronization timing information for the second mmW base station 210, a timing window parameter associated with attempting to perform the discovery procedure with the second mmW base station 210, and the like. The propagation parameter may include information associated with directional communications. Example propagation parameters may include, but are not limited to, a beamforming direction parameter based on the geographic locations of the first mmW base station 205 and the second mmW base station 210, a beam count parameter associated with one or more discovery beams (e.g., beacons and/or synchronization signals) transmitted by the second mmW base station 210, and the like.

At block 220, the first mmW base station 205 may initiate a discovery procedure 225 with the second mmW base station 210. The discovery procedure 225 may be based on the determined timing parameter, the determined propagation parameter, or a combination of both. At least a portion of the discovery procedure 225 may be performed wirelessly via the mmW wireless communication channel.

Figure 3:
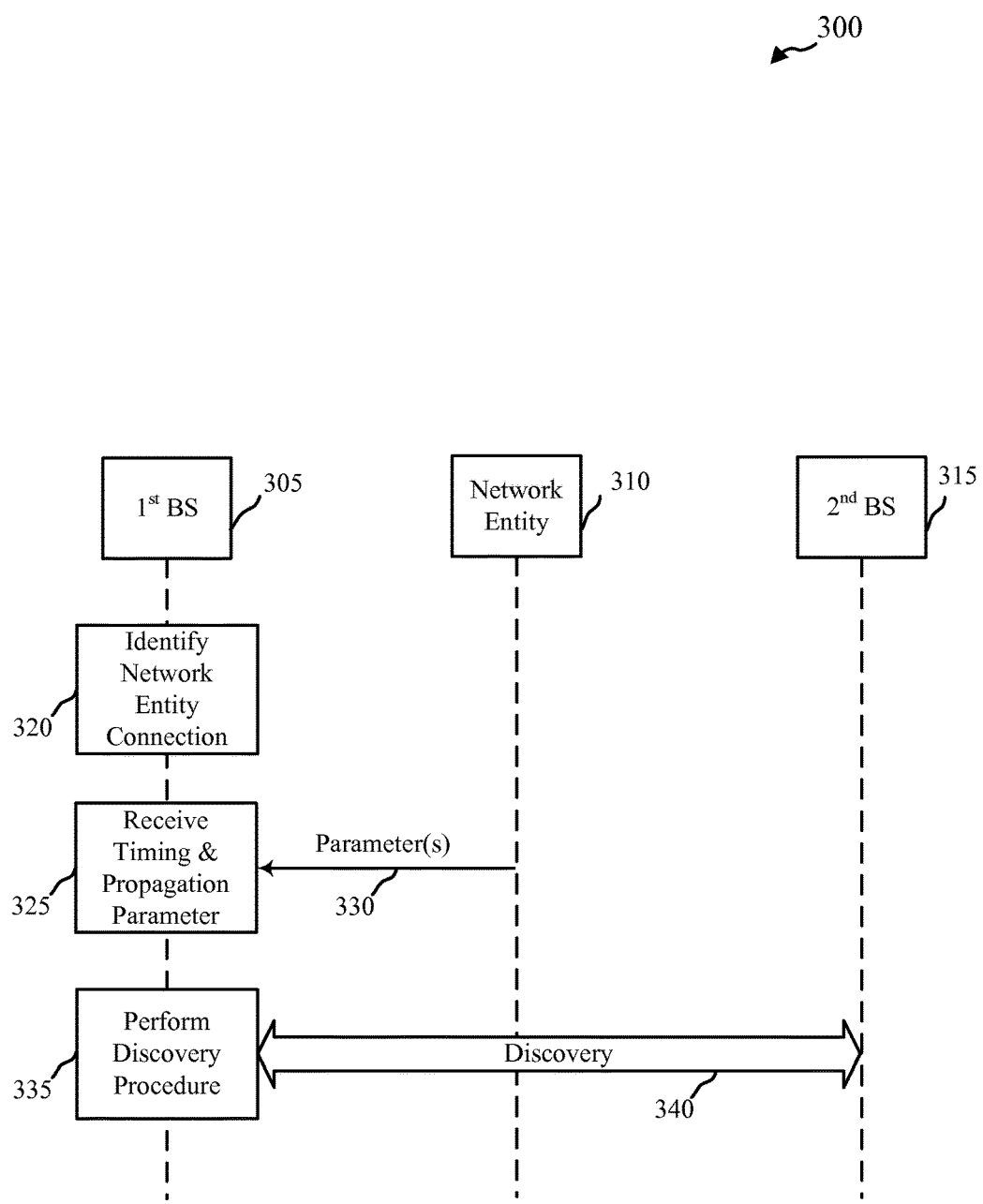
FIG. 3 shows a swim diagram illustrating aspects of discovery operations in wireless communication, in accordance with various aspects of the present disclosure.

FIG. 3 is a swim diagram 300 illustrating aspects of discovery operations, in accordance with various aspects of the present disclosure. The diagram 300 may illustrate aspects of the system 100 described with reference to FIG. 1. The diagram 300 includes a first millimeter wave (mmW) base station 305, a network entity 310, and a second mmW base station 315. The first mmW base station 305 and/or the second mmW base station 315 may be examples of one or more of the base stations 105 described above with respect to FIG. 1. The network entity 310 may be an example of the core network 130 described above with respect to FIG. 1. Generally, the diagram 300 illustrates aspects of implementing network assisted discovery operations in millimeter wave communication systems. In some examples, a system device, such as one of the base stations 105 may execute one or more sets of codes to control the functional elements of the device to perform some or all of the functions described below.

At block 320, the first mmW base station 305 may identify a connection with the network entity 310. The connection may be a direct connection to the network entity 310 and/or an indirect connection via a third mmW base station (not shown). For a direct connection, the first mmW base station 305 may have a limited connection that supports minimal data communications, e.g., via a low bandwidth connection and/or a restricted connection. The first mmW base station 305 may identify the connection with the network entity 310 that is also connected to the second mmW base station 315.

At block 325, the first mmW base station 305 may receive parameters 330 from the network entity 310. The parameters may include at least one of a timing parameter associated with the second mmW base station 315, a propagation parameter associated with the second mmW base station 315, or both parameters. In some examples, the first mmW base station 305 may send a message to the network entity 310 indicating a need to perform a discovery procedure with the second mmW base station 315 (or any neighboring mmW base station). The network entity 310 may store information associated with mmW base stations, e.g., geographical location information, operational capabilities, communication parameters, etc., and identify the second mmW base station 315 as a candidate for discovery and backhaul operations for the first mmW base station 305. Accordingly, the network entity 310 may select and send the parameters 330 to the first mmW base station 305 associated with the second mmW base station 315.

As previously discussed, the parameters sent may include a timing parameter and a propagation parameter associated with the second mmW base station 315. The timing parameter may include various timing components associated with communicating with the second mmW base station 315. The propagation parameter may include information associated with directional communications for the second mmW base station 315.

At block 335, the first mmW base station 305 may initiate and perform a discovery procedure 340 with the second mmW base station 315. The discovery procedure 340 may be based on the timing parameter, the propagation parameter, or a combination of both. At least a portion of the discovery procedure 340 may be performed wirelessly via the mmW wireless communication channel. The discovery procedure may, in some examples, permit the first mmW base station 305 to determine additional (or any missing) communication parameters for communicating with the second mmW base station 315, e.g., MCS parameters, channel availability and configurations, capability parameters, etc. Accordingly, the first mmW base station 305 may, based at least in part on the discovery procedure, establish a backhaul link with the second mmW base station 315 to perform backhaul operations.

Figure 4:
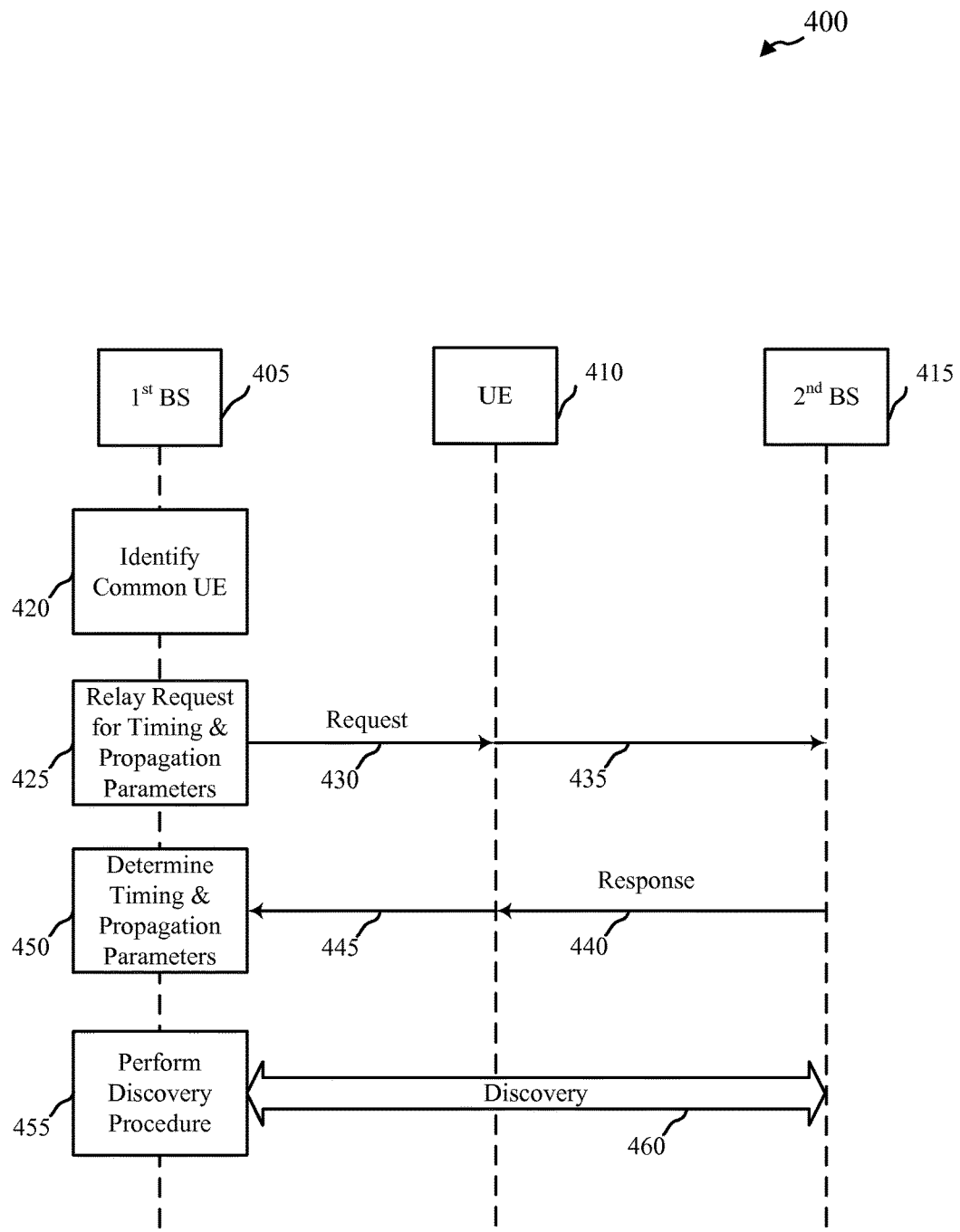
FIG. 4 shows a swim diagram illustrating aspects of discovery operations in wireless communication, in accordance with various aspects of the present disclosure.

FIG. 4 is a swim diagram 400 illustrating aspects of discovery operations, in accordance with various aspects of the present disclosure. The diagram 400 may illustrate aspects of the system 100 described with reference to FIG. 1. The diagram 400 includes a first millimeter wave (mmW) base station 405, a UE 410, and a second mmW base station 415. The first mmW base station 405 and/or the second mmW base station 415 may be examples of one or more of the base stations 105 described above with respect to FIG. 1. The UE 410 may be an example of the one or more of the UEs 115 described above with respect to FIG. 1. Generally, the diagram 400 illustrates aspects of implementing UE assisted discovery operations in millimeter wave communication systems. In some examples, a system device, such as one of the base stations 105 and/or UEs 115, may execute one or more sets of codes to control the functional elements of the device to perform some or all of the functions described below.

At block 420, the first mmW base station 405 may identify a common connection between the first mmW base station 405, the UE 410, and the second mmW base station 415. The common connection may be a direct connection to the second mmW base station 415 through the UE 410 and/or an indirect connection via one or more additional UEs (not shown). Generally, the common connection via the UE 410 may support limited communications between the first mmW base station 405 and the second mmW base station 415. In some examples, the UE 410 may send a neighbor cell list (NCL) to the first mmW base station including information identifying the second mmW base station 415, e.g., an identification information associated with the second mmW base station 415.

At block 425, the first mmW base station 405 may relay a request to the second mmW base station 415 via the UE 410. For example, the first mmW base station 405 may send a message 430 to the UE 410 requesting the UE 410 forward the message to the second mmW base station 415. The UE 410 may forward the message 435 to the second mmW base station 415. Generally, the forwarded message may include a request for the timing parameter, the propagation parameter, or both parameters associated with the second mmW base station 415.

The second mmW base station 415 may send a response 440 to the request from the first mmW base station 405 that is relayed 445 via the UE 410. Accordingly, at block 450 the first mmW base station 405 may determine the timing parameter, the propagation parameter, or both parameters associated with the second mmW base station 415. At block 455, the first mmW base station 405 may initiate and perform a discovery procedure 460 with the second mmW base station 415. The discovery procedure 460 may be based on the timing parameter, the propagation parameter, or a combination of both. At least a portion of the discovery procedure 460 may be performed wirelessly via the mmW wireless communication channel. The discovery procedure may, in some examples, permit the first mmW base station 405 to determine additional (or any missing) communication parameters for communicating with the second mmW base station, e.g., MCS parameters, channel availability and configurations, capability parameters, etc. Accordingly, the first mmW base station 405 may, based at least in part on the discovery procedure, establish a backhaul link with the second mmW base station to perform backhaul operations.

Figure 5:
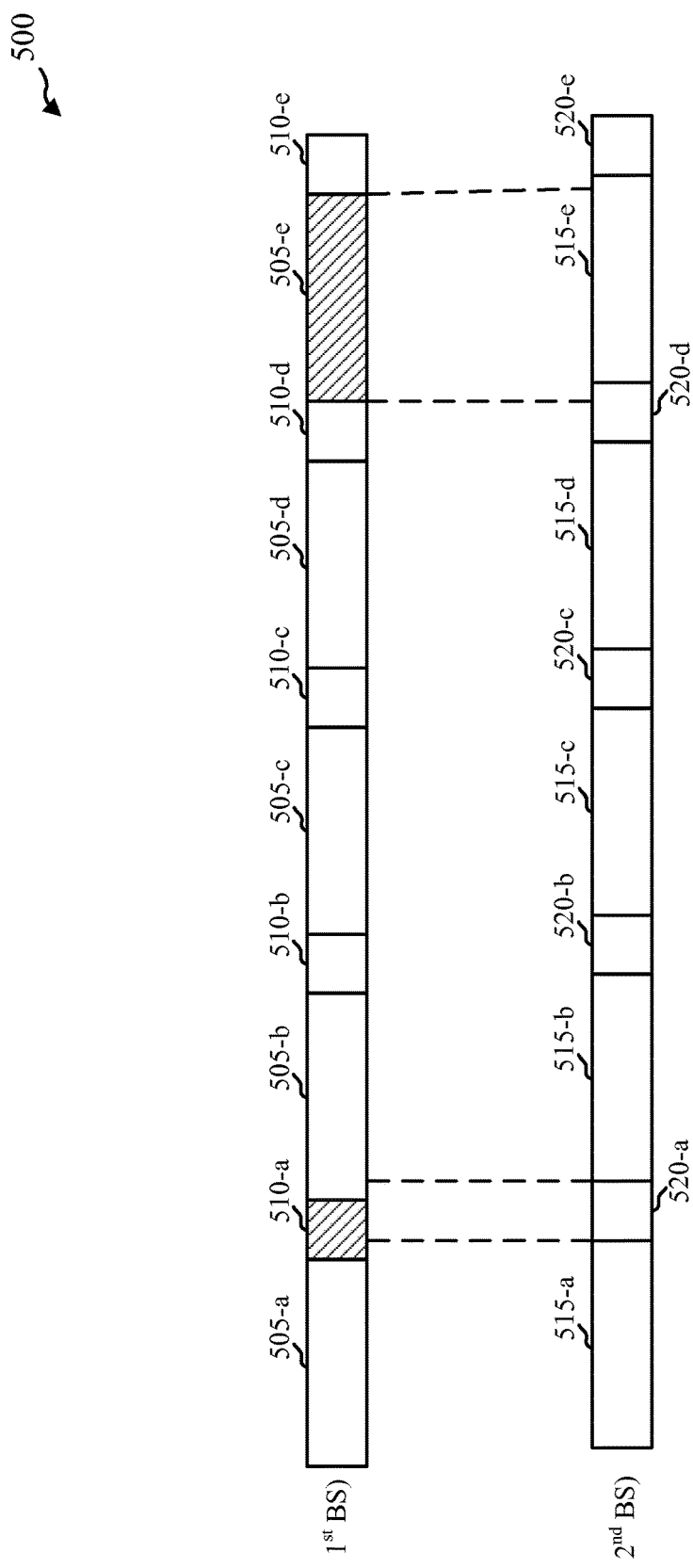
FIG. 5 shows a diagram of aspects of an example discovery operation in wireless communication, in accordance with various aspects of the present disclosure.

FIG. 5 shows a diagram 500 of aspects of an example discovery operation in wireless communication, in accordance with various aspects of the present disclosure. The diagram 500 may illustrate aspects of the system 100 described with reference to FIG. 1. Generally, diagram 500 illustrates an example of one or more aspects of discovery procedures between a first mmW base station and a second, neighboring mmW base station. In some examples, a system devices, such as one or more mmW base stations, such as base stations 105, first mmW base stations 205, 305, and/or 405, described with reference to FIGS. 1, 2, 3, and/or 4, may execute one or more sets of codes to control the functional elements of the device to perform some or all of the functions illustrated with respect to diagram 500.

Typical access procedures between a mmW base station and UEs within its coverage area may include transmission of various beacons, synchronization signals, etc., from the base station followed by access requests from the UEs. UEs may locate a base station by detecting the synchronization signal(s), from which the UEs acquire the base station identification code (cell ID), system timing information, frame alignment information, etc. For example, the first base mmW station may transmit one or more synchronization signals over a directional primary synchronization channel (DPSS) during a synchronization period 510 for UEs to detect its presence. The synchronization signal may include various attributes associated with the first mmW base station and used by the UE to gather additional parameters for communicating with the first mmW base station. The first mmW base station may then typically listen (or monitor) for responses from the UEs over a directional random access channel (DRACH) during an access period 505. Similarly, the second mmW base station sends its own synchronization signals during synchronization periods 520 and then monitors for responses from UEs within its coverage area during access periods 515.

In some examples, mmW base stations may perform over-the-air discovery procedures (e.g., blind discovery procedures) by provisioning certain access resources for discovery operations. For example, the first mmW base station may switch roles, not transmit during its synchronization period 510 and, instead, listen for synchronization signals transmitted from the second mmW base station. As illustrated in diagram 500, the first mmW base station may refrain from transmitting its synchronization signal during synchronization period 510-*a* and, instead, listen for synchronization signals transmitted from the second mmW base station during its synchronization period 520-*a*.

Similarly, the first mmW base station may re-provision access resources to transmit its synchronization signals during an access period 505. As illustrated in diagram 500, the first mmW base station may refrain from listening during access period 505-*e* and, instead, transmit its synchronization signals during the access period 505-*e*. The second mmW base station may then detect the synchronization signal transmissions during its access period 515-*e*. Accordingly, diagram 500 illustrates examples of provisioning schemes that can be employed for discovery operations in mmW wireless communication systems.

According to certain aspects, the periodicity of such resource provisioning may be relatively low. For example, the mmW base stations may switch roles only occasionally, or at a periodicity at or below a threshold level, to provide sufficient access opportunities for the UEs within their respective coverage areas.

In some examples, the timing parameter determined by the first mmW base station may correspond to the synchronization period and/or access period for the second mmW base station. For instance, the first mmW base station may determine such timing parameters based on information received from a network entity, via a UE communicating with the first and second mmW base stations, and/or using a blind discovery procedure. As also illustrated in diagram 500, the first and second mmW base stations may not share a common timing synchronization, i.e., be out of synch with each other. While the described blind discovery procedure will permit the first mmW base station to determine the timing parameter for the second mmW base station, the first mmW base station may have already determined the timing parameter using any of the described techniques and, therefore, provision resources based at least in part on the timing parameter associated with the second mmW base station.

Moreover, the first mmW base station may perform such a discovery procedure to determine (or after having determined) the timing parameter with or without the propagation parameter associated with the second mmW base station. For example, the first mmW may try to detect synchronization signal transmissions from the second mmW base station using a sweeping pattern where certain antennas are configured to directional communications, e.g., beamforming. The first mmW base station may listen in a first direction during a first synchronization period, e.g., synchronization period 510-*a*, and then listen in a second direction during a subsequent synchronization period. Accordingly, the first mmW base station may detect synchronization signals transmitted from the second mmW base station (as well as other neighboring mmW base stations) without knowing the direction (e.g., geographic location) of the base stations.

Figure 6:
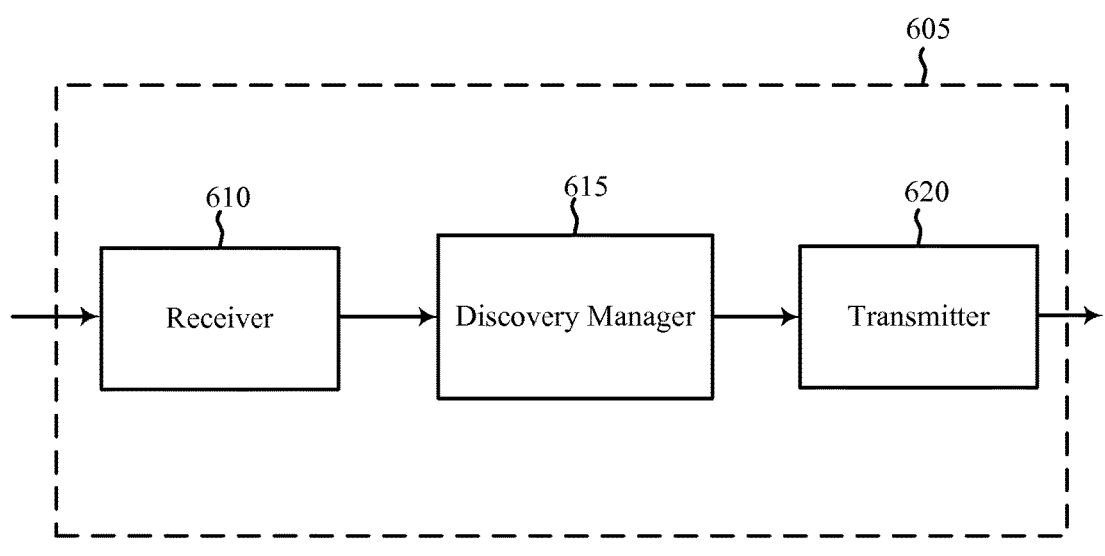
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. In some examples, the apparatus 605 may be an example of aspects of one or more of the base stations 105, 205, 305, and/or 405 described with reference to FIGS. 1, 2, 3, and 4, respectively. In some examples, the apparatus 605 may be part of or include an LTE/LTE-A eNB and/or an LTE/LTE-A base station. The apparatus 605 may be a base station operating in a mmW wireless communication system. The apparatus 605 may also be a processor. The apparatus 605 may include a receiver 610, a discovery manager 615, and/or a transmitter 620. Each of these modules may be in communication with each other.

The components of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one radio frequency (RF) receiver, such as an RF receiver operable to receive one or more messages associated with a discovery procedure for the apparatus 605. The receiver 610 may be used to receive various types of data and/or control signals (i.e., transmissions) over one or more communication links of a wireless communication system, such as one or more communication links of the wireless communications system 100 described with reference to FIG. 1.

In some examples, the transmitter 620 may include at least one RF transmitter, such as at least one RF transmitter operable to transmit one or more messages associated with a discovery procedure for the apparatus 605. The transmitter 620 may be used to transmit various types of data and/or control signals (i.e., transmissions) over one or more communication links of a wireless communication system, such as one or more communication links of the wireless communications system 100 described with reference to FIG. 1.

In some examples, the discovery manager 615 may monitor, control, or otherwise manage one or more aspects of a discovery procedure for the apparatus 605. For example, the apparatus 605 may be a mmW base station that seeks to initiate and perform a discovery procedure with a second mmW base station to establish a backhaul link for backhaul operations. The discovery manager 615 may determine a timing parameter, a propagation parameter, or both a timing and propagation parameters associated with the second mmW base station. The discovery manager 615 may also perform a discovery procedure with the second mmW base station based on the timing parameter and the propagation parameter. At least a portion of the discovery procedure may be performed wirelessly via the mmW wireless communication system.

In some examples, the discovery manager 615 may manage aspects of establishing a backhaul communication link with the second mmW base station based on the discovery procedure, e.g., a wireless backhaul communication link via the mmW wireless communication system. The apparatus 605 may perform various coordination functions with the second mmW base station via the backhaul communication link.

In some examples, the discovery manager 615 may determine a timing parameter associated with the second mmW base station, where the timing parameter is based on a frame timing attribute for communicating with the second mmW base station. Moreover, the propagation parameter may, in certain examples, be based on a beamforming pattern for communicating with the second mmW base station.

Figure 7:
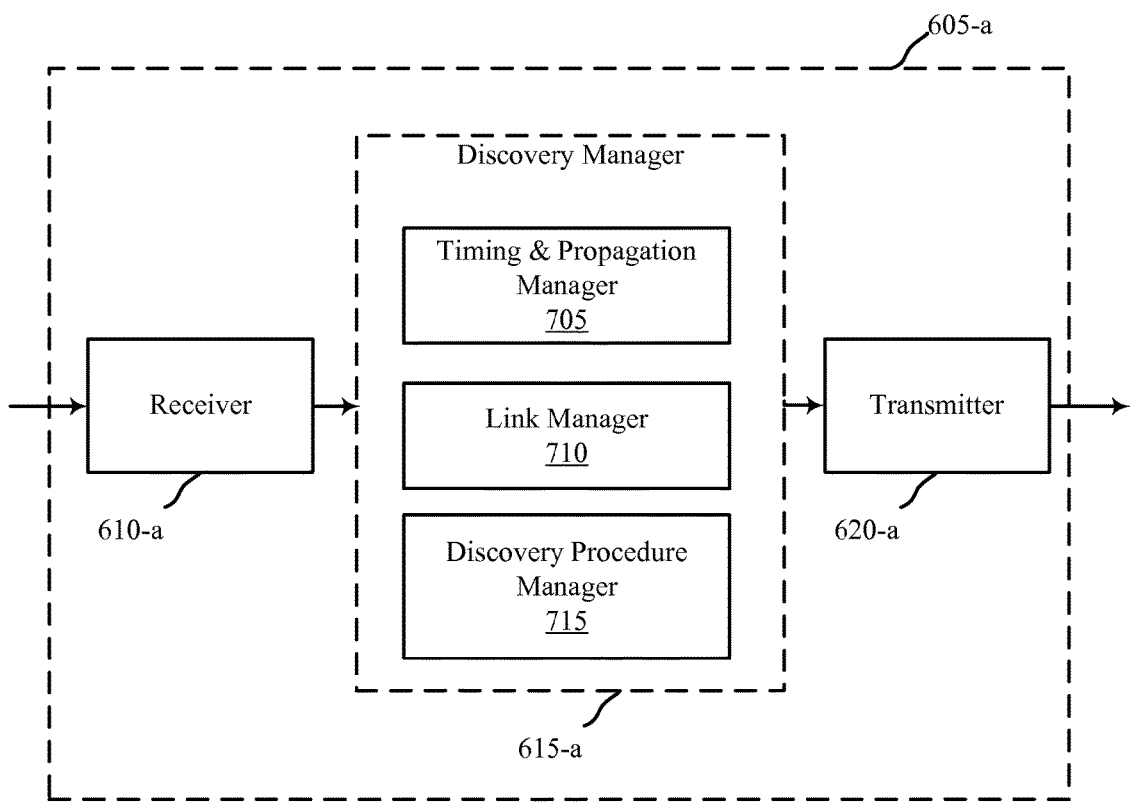
FIG. 7 shows a block diagram of an apparatus for use in wireless communication, in accordance with various aspects of the present disclosure.

FIG. 7 shows a block diagram 700 of an apparatus 605-*a* for use in wireless communication, in accordance with various aspects of the present disclosure. In some examples, the apparatus 605-a may be an example of aspects of one or more of the base stations 105, 205, 305, and/or 405 described with reference to FIGS. 1, 2, 3, and 4, respectively. In some examples, the apparatus 605-a may be an example of the apparatus 605 described with reference to FIG. 6. In some examples, the apparatus 605-a may be part of or include an LTE/LTE-A eNB and/or an LTE/LTE-A base station. The apparatus 605-a may be a base station operating in a mmW wireless communication system. The apparatus 605-a may also be a processor. The apparatus 605-a may include a receiver 610-a, a discovery manager 615-a, and/or a transmitter 620-a. Each of these modules may be in communication with each other. The receiver 610-a and the transmitter 620-a may be examples of and perform the functions of the receiver 610 and the transmitter 620, respectively, described with reference to FIG. 6. In some examples, the discovery manager 615-a may be an example of the discovery manager 615 described with reference to FIG. 6 and may include a timing and propagation manager 705, a link manager 710, and/or discovery procedure manager 715.

In some examples, the timing and propagation manager 705 may monitor, control, or otherwise manage aspects of determining a timing parameter and a propagation parameter associated with communicating with a second mmW base station. For example, the timing parameter may be based on a frame timing attribute for communicating with the second mmW base station. Other examples of timing parameters may include beam sequencing timing information associated with one or more synchronization periods and/or access periods for the second mmW base station. The propagation parameter may, in certain examples, be based on a beamforming pattern for communicating with the second mmW base station.

In some examples, the timing and propagation manager 705 may cooperate with the link manager 710 to determine the timing and propagation parameters. For example, the timing and propagation manager 705 may, alone or in cooperation with one or more other components of the apparatus 605-a, cause the apparatus 605-a to refrain from transmitting a synchronization signal during a synchronization period and, instead, monitor during the synchronization period for a synchronization signal transmitted by the second base station. When it is determined that the second base station has transmitted a synchronization signal, the timing and propagation manager 705 may initiate the discovery procedure based at least in part on the transmitted synchronization signal. In some examples, the message to the second base station to initiate the discovery procedure may be sent via a downlink directional random access channel (DRACH).

In some examples, the timing and propagation manager 705 may determine a predetermined periodicity associated with refraining from transmitting the synchronization signal and monitoring for the synchronization signal transmission from the second base station. The periodicity may be determined, at least in some examples, based at least in part on information received from a network entity. In some examples, the synchronization signal transmitted from the second base station may be a directional primary synchronization signal (DPSS).

The link manager 710 may monitor, control, or otherwise manage one or more aspects of identifying a link that may, in certain examples, be leveraged to determine aspects of the timing parameter and/or the propagation parameter for the apparatus 605-a. In one example, the link manager 710 may identify a network entity having a connection to the apparatus 605-a and the second mmW base station. The link manager 710 may receive information from the network entity indicative of at least one of the timing parameter, or the propagation parameter, or a combination thereof. For example, the link manager 710 may, alone or in cooperation with the transmitter 620-a, transmit information to the network entity indicating a request to establish a backhaul communication link with the second base station.

In some examples, the link manager 710 may determine that the network entity is connected to the apparatus 605-a and the second base station via a wired communication link, e.g., an Ethernet communication link. Additionally or alternatively, the link manager 710 may determine the network entity is connected to the apparatus 605-a and the second base station via a wireless communication link associated with a third base station of the millimeter wave wireless communication system. That is, the apparatus 605-a may be in communication, e.g., via a backhaul link, with a third mmW base station and leverage the link to determine aspects of the timing parameter and/or the propagation parameter.

In some examples, the information received from the network entity indicative of at least one of the timing parameter or the propagation parameter may be based on a previous backhaul communication link of the apparatus 605-a or the second base station, or a geographic location of the apparatus 605-a and the second base station, or a message received from one or more user equipments (UEs) associated with communications via the apparatus 605-a or the second base station, or combinations thereof. Moreover, the information received from the network entity may also include additional communication parameters associated with the second mmW base station. Examples include, but are not limited to, an indication of a timing window parameter associated with a timing window for attempting to perform the discovery procedure, a search beam parameter associated with a quantity of beams being transmitted by the second base station, a sequence parameter associated with a transmission sequence of the second base station, a base station capabilities parameter identifying one or more capabilities of the second base station, or combinations thereof.

In some examples, the link manager 710 may determine that at least one user equipment (UE) is in communication with the apparatus 605-a and the second base station and, relay one or more messages to the second base station through the at least one UE to determine at least one of the timing parameter or the propagation parameter associated with the second base station. Accordingly, the link manager 710 may, alone or in cooperation with the receiver 610-a, receive one or more messages from the UE including information associated with the second base station, and determine to perform the discovery procedure based at least in part on the one or more messages received from the UE.

In some examples, the information received from the UE associated with the second base station may also include an indication of a timing window parameter associated with a timing window for attempting to perform the discovery procedure, a search beam parameter associated with a quantity of beams being transmitted by the second base station, a sequence parameter associated with a transmission sequence of the second base station, a base station capabilities parameter identifying one or more capabilities of the second base station, or combinations thereof. The at least one UE may, in some examples, be in communication with the apparatus 605-a and the second base station via a wireless communication link of the millimeter wave wireless communication system.

The discovery procedure manager 715 may monitor, control, or otherwise manage aspects of performing a discovery procedure for the apparatus 605-*a*. The discovery procedure may be performed with the second mmW base station and, in some example, be performed wirelessly via the mmW wireless communication system. The discovery procedure manager 715 may utilize the timing parameter to determine a frame timing attribute for communicating with the second mmW base station, to determine a synchronization signal transmission time or pattern from the second mmW base station, etc. The discovery procedure manager 715 may utilize the propagation parameter to determine a beamforming direction for communication with the second mmW base station. Accordingly, the discovery procedure manager 715 may, alone or in cooperation with the other components of the apparatus 605-*a*, initiate and perform a discovery procedure with the second mmW base station to determine communication parameters associated with establishing a backhaul communication link for performing backhaul operations.

Figure 8:
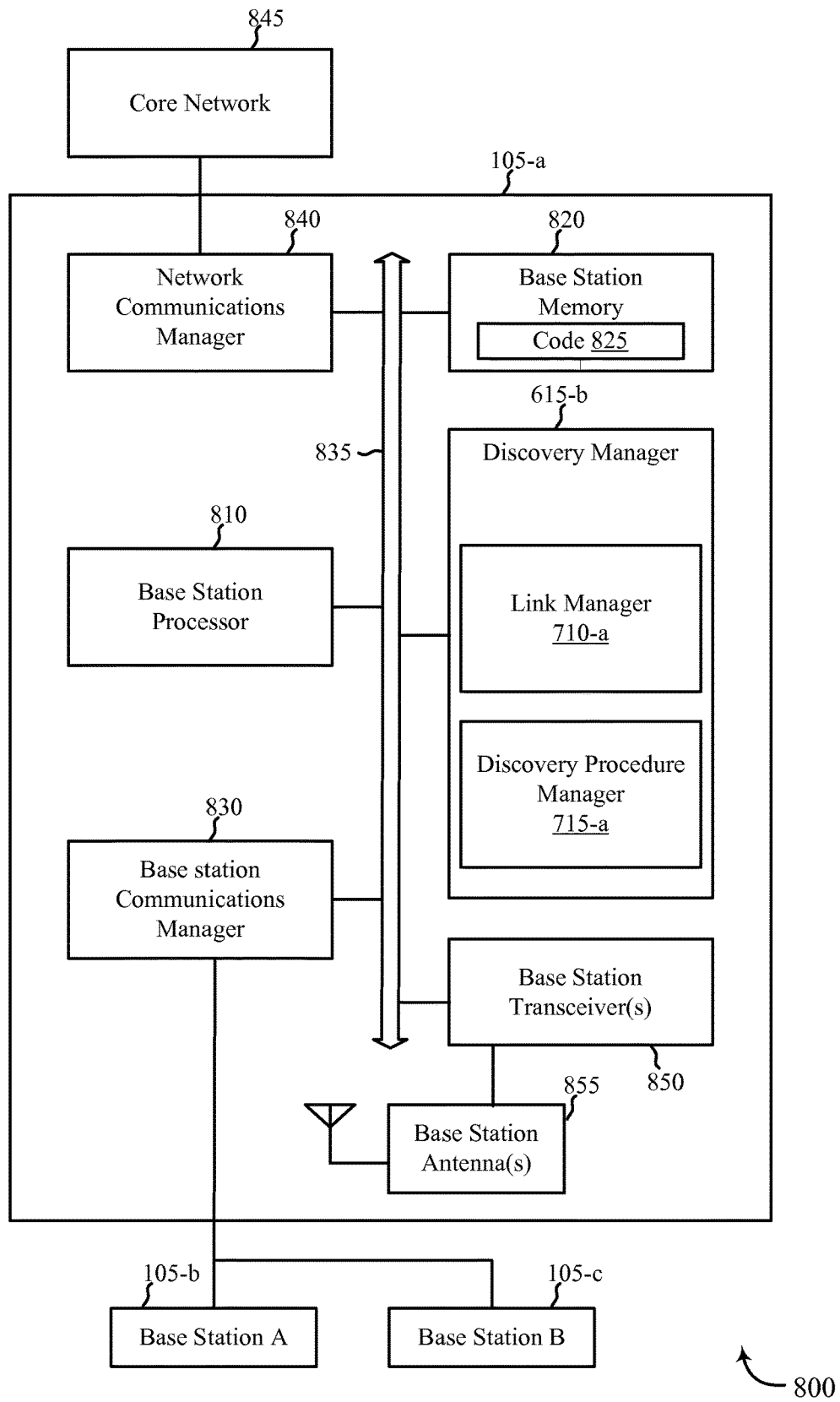
FIG. 8 shows a block diagram of a base station (e.g., a base station forming part or all of an eNB) for use in wireless communication, in accordance with various aspects of the present disclosure.

FIG. 8 shows a block diagram 800 of a base station 105-*a* (e.g., a base station forming part or all of an eNB) for use in wireless communication, in accordance with various aspects of the present disclosure. In some examples, the base station 105-*a* may be an example of aspects of one or more of the base stations 105 described with reference to FIG. 1, aspects of one or more of the first base stations 205, 305, and 405, described with reference to FIGS. 2, 3, and 4, respectively, and/or aspects of one or more of the apparatus 605 when configured as a base station, as described with reference to FIGS. 6 and/or 7. The base station 105-*a* may be configured to implement or facilitate at least some of the base station and/or apparatus features and functions described with reference to FIGS. 1-7.

The base station 105-*a* may include a base station processor 810, a base station memory 820, at least one base station transceiver (represented by base station transceiver 850), at least one base station antenna (represented by base station antenna(s) 855), and/or a discovery manager 615-*b*. The base station 105-*a* may also include one or more of a base station communications manager 830 and/or a network communications manager 840. Each of these modules may be in communication with each other, directly or indirectly, over one or more buses 835.

The base station memory 820 may include random access memory (RAM) and/or read-only memory (ROM). The base station memory 820 may store computer-readable, computer-executable software/firmware code 825 containing instructions that are configured to, when executed, cause the base station processor 810 to perform various functions described herein related to wireless communication (e.g., to perform discovery operations in a millimeter wave wireless communication system, etc.). Alternatively, the computer-readable, computer-executable software/firmware code 825 may not be directly executable by the base station processor 810 but may be configured to cause the base station 105-*a* (e.g., when compiled and executed) to perform various of the functions described herein.

The base station processor 810 may include an intelligent hardware device, e.g., a central processing unit (CPU), a microcontroller, an ASIC, etc. The base station processor 810 may process information received through the base station transceiver 850, the base station communications manager 830, and/or the network communications manager 840. The base station processor 810 may also process information to be sent to the transceiver 850 for transmission through the antenna(s) 855, to the base station communications manager 830, for transmission to one or more other base stations 105-*b* and 105-*c*, and/or to the network communications manager 840 for transmission to a core network 845, which may be an example of one or more aspects of the core network 130 described with reference to FIG. 1. The base station processor 810 may handle, alone or in connection with the discovery manager 615-*b*, various aspects of discovery procedures for the base station 105-*a*.

The base station transceiver 850 may include a modem configured to modulate packets and provide the modulated packets to the base station antenna(s) 855 for transmission, and to demodulate packets received from the base station antenna(s) 855. The base station transceiver 850 may, in some examples, be implemented as one or more base station transmitter modules and one or more separate base station receiver modules. The base station transceiver 850 may support communications in a first radio frequency spectrum band and/or a second radio frequency spectrum band. The base station transceiver 850 may be configured to communicate bi-directionally, via the antenna(s) 855, with one or more UEs or apparatuses, such as one or more of the UEs 115 described with reference to FIGS. 1-5. The base station 105-*a* may, for example, include multiple base station antennas 855 (e.g., an antenna array). The base station 105-*a* may communicate with the core network 845 through the network communications manager 840. The base station 105-*a* may also communicate with other base stations, such as the base stations 105-*b* and 105-*c*, using the base station communications manager 830.

The discovery manager 615-*b* may be configured to perform and/or control some or all of the features and/or functions described with reference to FIGS. 1-7 related to discovery operations for the base station 105-*a*. In some examples, the discovery manager 615-*b* may determine timing and/or propagation parameters associated with a second mmW base station and perform a discovery procedure with the second mmW base station. The discovery manager 615-*b*, or portions thereof, may include a processor, and/or some or all of the functions of the discovery manager 615-*b* may be performed by the base station processor 810 and/or in connection with the base station processor 810. In some examples, the discovery manager 615-*b* may be an example of the discovery manager 615 described with reference to FIGS. 6 and/or 7. For example, the discovery manager 615-*b* may include a link manager 710-*a* and a discovery procedure manager 715-*a*, which may be examples of and perform the functions of the link manager 710 and the discovery procedure manager 715, respectively, described with reference to FIG. 7.

Figure 9:
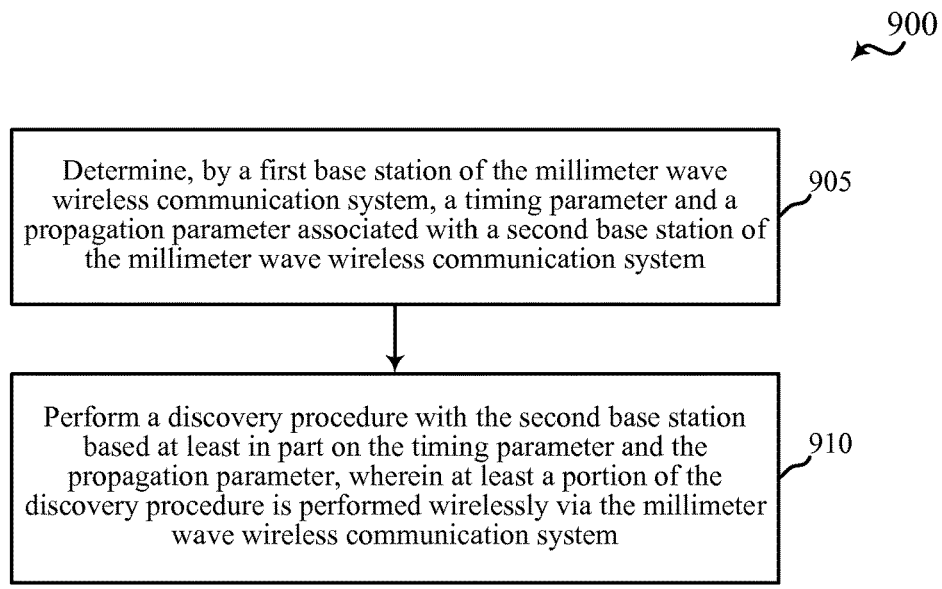
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the base stations 105, 205, 305, 405 described with reference to FIGS. 1, 2, 3, 4, and 8, respectively, and/or aspects of one or more of the apparatuses 605 described with reference to FIGS. 6 and 7. In some examples, a base station may execute one or more sets of codes to control the functional elements of the base station to perform the functions described below. Additionally or alternatively, the base station may perform one or more of the functions described below using special-purpose hardware.

At block 905, the method 900 may include a first base station of a mmW wireless communication system determining a timing parameter and a propagation parameter associated with a second base station of the mmW wireless communication system. The timing parameter may include a frame timing attribute, a synchronization signal transmission timing attribute, and the like. The propagation parameter may include a beamforming parameter, a beam sequence, and the like, associated with communicating with the second base station.

At block 910, the method 900 may include the first base station performing a discovery procedure with the second base station based at least in part on the timing parameter and the propagation parameter. In some examples, at least a portion of the discovery procedure may be performed wirelessly via the mmW wireless communication system. The discovery procedure may include the first base station determining additional communication parameters associated with communicating with the second base station, e.g., MCS parameters, base station capability parameters, etc.

The operation(s) at block 905 and/or 910 may be performed using the discovery manager 615 described with reference to FIGS. 6-8.

Thus, the method 900 may provide for wireless communication. It should be noted that the method 900 is just one implementation and that the operations of the method 900 may be rearranged or otherwise modified such that other implementations are possible.

Figure 10:
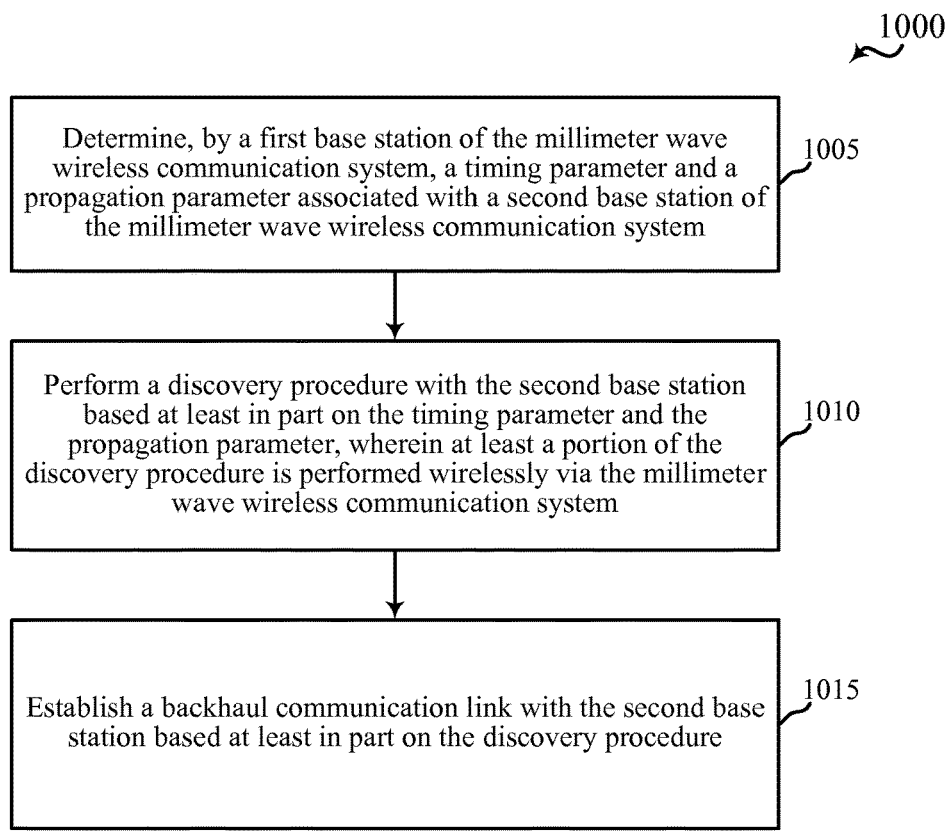
FIG. 10 is a flow chart illustrating another example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the base stations 105, 205, 305, 405 described with reference to FIGS. 1, 2, 3, 4, and 8, respectively, and/or aspects of one or more of the apparatuses 605 described with reference to FIGS. 6 and 7. In some examples, a base station may execute one or more sets of codes to control the functional elements of the base station to perform the functions described below. Additionally or alternatively, the base station may perform one or more of the functions described below using special-purpose hardware.

At block 1005, the method 1000 may include a first base station of a mmW wireless communication system determining a timing parameter and a propagation parameter associated with a second base station of the mmW wireless communication system. The timing parameter may include a frame timing attribute, a synchronization signal transmission timing attribute, and the like. The propagation parameter may include a beamforming parameter, a beam sequence, and the like, associated with communicating with the second base station.

At block 1010, the method 1000 may include the first base station performing a discovery procedure with the second base station based at least in part on the timing parameter and the propagation parameter. In some examples, at least a portion of the discovery procedure may be performed wirelessly via the mmW wireless communication system. The discovery procedure may include the first base station determining additional communication parameters associated with communicating with the second base station, e.g., MCS parameters, base station capability parameters, etc.

At block 1015, the method 1000 may include the first base station establishing a backhaul communication link with the second base station based at least in part on the discovery procedure. For example, the discovery procedure may provide the additional communication parameters for establishing the backhaul communication link via the mmW wireless communication system. The first base station may perform various coordination functions with the second base station via the backhaul communication link.

The operation(s) at block 1005, 1010, and/or 1015 may be performed using the discovery manager 615 described with reference to FIGS. 6-8.

Thus, the method 1000 may provide for wireless communication. It should be noted that the method 1000 is just one implementation and that the operations of the method 1000 may be rearranged or otherwise modified such that other implementations are possible.

Figure 11:
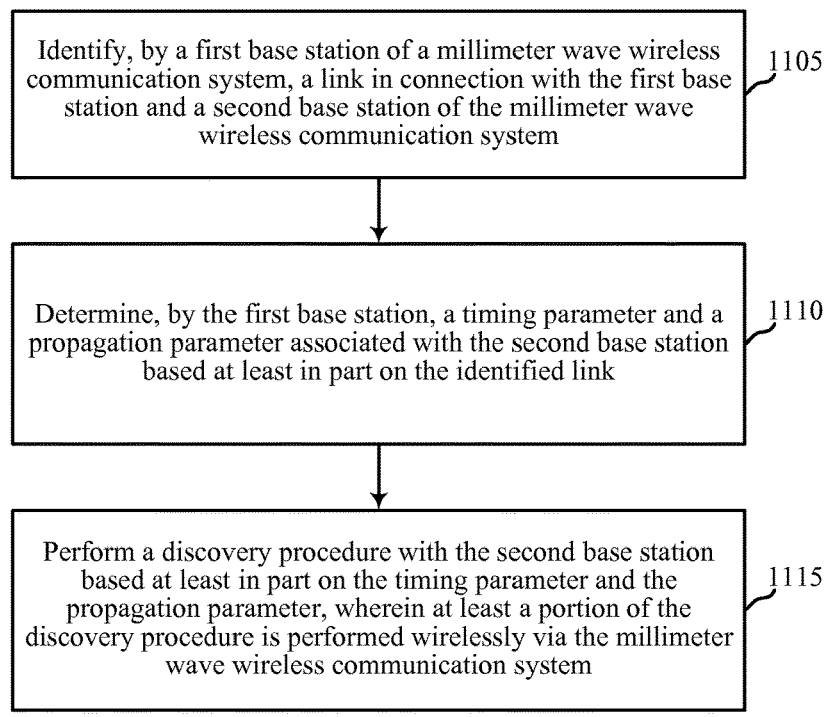
FIG. 11 is a flow chart illustrating another example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the base stations 105, 205, 305, 405 described with reference to FIGS. 1, 2, 3, 4, and 8, respectively, and/or aspects of one or more of the apparatuses 605 described with reference to FIGS. 6 and 7. In some examples, a base station may execute one or more sets of codes to control the functional elements of the base station to perform the functions described below. Additionally or alternatively, the base station may perform one or more of the functions described below using special-purpose hardware.

At block 1105, the method 1100 may include a first base station of a mmW wireless communication system identifying a link in connection with a second base station of the mmW wireless communication system. In some examples, the link may include a wired and/or wireless link to a network entity, a third base station of the mmW wireless communication system, one or more UEs in communication with the first base station and the second base station, or combinations thereof.

At block 1110, the method 1100 may include the first base station determining a timing parameter and a propagation parameter associated with the second base station. The first base station may determine the timing and propagation parameters based on the identified link, e.g., via one or more messages exchanged with, or routed through the link.

At block 1115, the method 1100 may include the first base station performing a discovery procedure with the second base station based at least in part on the timing parameter and the propagation parameter. In some examples, at least a portion of the discovery procedure may be performed wirelessly via the mmW wireless communication system. The discovery procedure may include the first base station determining additional communication parameters associated with communicating with the second base station, e.g., MCS parameters, base station capability parameters, etc.

The operation(s) at block 1105, 1110, and/or 1115 may be performed using the discovery manager 615 described with reference to FIGS. 6-8.

Thus, the method 1100 may provide for wireless communication. It should be noted that the method 1100 is just one implementation and that the operations of the method 1100 may be rearranged or otherwise modified such that other implementations are possible.

In some examples, aspects from two or more of the methods 900, 1000, 1100 may be combined. It should be noted that the methods 900, 1000, etc. are just example implementations, and that the operations of the methods 900-1100 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication in a millimeter wave wireless communication system, comprising:

determining, by a first base station of the millimeter wave wireless communication system, a timing parameter and a propagation parameter that are each associated with a synchronization signal transmitted by a second base station of the millimeter wave wireless communication system;

detecting, by the first base station of the millimeter wave wireless communication system, the synchronization signal during a synchronization transmission period scheduled for transmission by the first base station in which the first base station refrains from transmitting a synchronization signal to perform the detecting, the synchronization transmission period being determined based at least in part on one of the timing parameter or the propagation parameter;

performing a discovery procedure with the second base station based at least in part on the timing parameter and the propagation parameter, wherein at least a portion of the discovery procedure is performed wirelessly via the millimeter wave wireless communication system; and establishing, by the first base station of the millimeter wave wireless communication system, a backhaul communication link with the second base station based at least in part on the discovery procedure.

2. The method of claim 1, further comprising:
identifying a network entity having a connection to the first base station and the second base station; and
receiving information from the network entity indicative of at least one of the timing parameter, or the propagation parameter, or a combination thereof.

3. The method of claim 2, further comprising:
transmitting information to the network entity indicating a request to establish the backhaul communication link with the second base station.

4. The method of claim 2, wherein the network entity is connected to the first base station and the second base station via a wired communication link.

5. The method of claim 2, wherein the network entity is connected to the first base station and the second base station via a wireless communication link associated with a third base station of the millimeter wave wireless communication system.

6. The method of claim 2, wherein the information received from the network entity indicative of at least one of the timing parameter or the propagation parameter is based at least in part on a previous backhaul communication link of the first base station or the second base station, or a message received from one or more user equipments (UEs) associated with communications via the first base station or the second base station, or combinations thereof.

7. The method of claim 2, wherein the information received from the network entity further comprises an indication of a timing window parameter associated with a timing window for attempting to perform the discovery procedure, a search beam parameter associated with a quantity of beams being transmitted by the second base station, a sequence parameter associated with a transmission sequence of the second base station, or combinations thereof.

8. The method of claim 1, further comprising:
refraining, by the first base station, from transmitting a synchronization signal during at least the synchronization transmission period scheduled for transmission by the first base station; and
monitoring, by the first base station during the synchronization transmission period, for the synchronization signal transmitted by the second base station.

9. The method of claim 8, further comprising:
upon determining that the second base station has transmitted the synchronization signal, initiating the discovery procedure based at least in part on the transmitted synchronization signal.

10. The method of claim 9, wherein a message to the second base station to initiate the discovery procedure is sent via a directional random access channel (DRACH).

11. The method of claim 8, further comprising:
determining, by the first base station, a predetermined periodicity associated with refraining from transmitting the synchronization signal during the synchronization transmission period and monitoring for the synchronization signal transmitted by the second base station.

12. The method of claim 8, wherein the synchronization signal transmitted from the second base station comprises a directional primary synchronization signal (DPSS).

13. The method of claim 1, wherein the backhaul communication link is a wireless backhaul communication link established via the millimeter wave wireless communication system.

14. The method of claim 1, further comprising:
performing one or more coordination functions with the second base station via the backhaul communication link.

15. The method of claim 1, wherein the timing parameter is based at least in part on a frame timing for communications associated with the second base station of the millimeter wave wireless communication system.

16. The method of claim 1, wherein the propagation parameter is based at least in part on a beamforming pattern for communications between the first base station and the second base station.

17. An apparatus for wireless communication by a first base station of a millimeter wave wireless communication system, comprising:
a processor;
memory in electronic communication with the processor; and
instructions stored in the memory, the instructions being executable by the processor to:
determine, by the first base station of the millimeter wave wireless communication system, a timing parameter and a propagation parameter that are each associated with a synchronization signal transmitted by a second base station of the millimeter wave wireless communication system;
detect, by the first base station of the millimeter wave wireless communication system, the synchronization signal during a synchronization transmission period scheduled for transmission by the first base station in which the first base station refrains from transmitting a synchronization signal to perform a detection, the synchronization transmission period being determined based at least in part on one of the timing parameter or the propagation parameter;
perform a discovery procedure with the second base station based at least in part on the timing parameter and the propagation parameter, wherein at least a portion of the discovery procedure is performed wirelessly via the millimeter wave wireless communication system; and
establish, by the first base station of the millimeter wave wireless communication system, a backhaul communication link with the second base station based at least in part on the discover procedure.

18. The apparatus of claim 17, further comprising instructions executable by the processor to:

identify a network entity having a connection to the first base station and the second base station; and receive information from the network entity indicative of at least one of the timing parameter, or the propagation parameter, or a combination thereof.

19. The apparatus of claim 18, further comprising instructions executable by the processor to:

transmit information to the network entity indicating a request to establish the backhaul communication link with the second base station.

20. The apparatus of claim 17, further comprising instructions executable by the processor to:

refrain, by the first base station, from transmitting a synchronization signal during at least the synchronization transmission period scheduled for transmission by the first base station; and monitor, by the first base station during the synchronization transmission period, for the synchronization signal transmitted by the second base station.

21. An apparatus for wireless communication by a first base station of a millimeter wave wireless communication system, comprising:

means for determining, by the first base station of the millimeter wave wireless communication system, a timing parameter and a propagation parameter that are each associated with a synchronization signal transmitted by a second base station of the millimeter wave wireless communication system;

means for detecting, by the first base station of the millimeter wave wireless communication system, the synchronization signal during a synchronization transmission period scheduled for transmission by the first base station in which the first base station refrains from transmitting a synchronization signal to perform the detecting, the synchronization transmission period being determined based at least in part on one of the timing parameter or the propagation parameter;

means for performing a discovery procedure with the second base station based at least in part on the timing parameter and the propagation parameter, wherein at least a portion of the discovery procedure is performed wirelessly via the millimeter wave wireless communication system; and means for establishing, by the first base station of the millimeter wave wireless communication, a backhaul communication link with the second base station based at least in part on the discovery procedure.

22. The apparatus of claim 21, further comprising:

means for identifying a network entity having a connection to the first base station and the second base station; and means for receiving information from the network entity indicative of at least one of the timing parameter, or the propagation parameter, or a combination thereof.

23. The apparatus of claim 22, further comprising:

means for transmitting information to the network entity indicating a request to establish the backhaul communication link with the second base station.

24. A non-transitory computer-readable medium storing computer-executable code for wireless communication, the code executable by a processor to:

determine, by a first base station of a millimeter wave wireless communication system, a timing parameter and a propagation parameter that are each associated with a synchronization signal transmitted by a second base station of the millimeter wave wireless communication system;

detect, by the first base station of the millimeter wave wireless communication system, the synchronization signal during a synchronization transmission period scheduled for transmission by the first base station in which the first base station refrains from transmitting a synchronization signal to perform a detection, the synchronization transmission period being determined based at least in part on one of the timing parameter or the propagation parameter;

perform a discovery procedure with the second base station based at least in part on the timing parameter and the propagation parameter, wherein at least a portion of the discovery procedure is performed wirelessly via the millimeter wave wireless communication system; and establish, by the first base station of the millimeter wave wireless communication system, a backhaul communication link with the second base station based at least in part on the discovery procedure.

* * * * *